United States Patent
Khafizova (10) Patent No.: US 9,244,636 B1
(45) Date of Patent: *Jan. 26, 2016

(54) SYSTEMS AND METHODS FOR PRINTING A DOCUMENT FROM A MOBILE COMMUNICATION DEVICE

(71) Applicant: OPEN INVENTION NETWORK LLC, Durham, NC (US)

(72) Inventor: Margarita Khafizova, Plano, TX (US)

(73) Assignee: Open Invention Network, LLC, Durham, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 14/628,428

(22) Filed: Feb. 23, 2015

Related U.S. Application Data (63) Continuation of application No. 14/334,338, filed on Jul. 17, 2014, now Pat. No. 8,964,235, which is a continuation of application No. 12/753,163, filed on Apr. 2, 2010, now Pat. No. 8,786,875.

(60) Provisional application No. 61/317,741, filed on Mar. 26, 2010, provisional application No. 61/317,744, filed on Mar. 26, 2010, provisional application No. 61/317,827, filed on Mar. 26, 2010, provisional application No. 61/317,800, filed on Mar. 26, 2010, provisional application No. 61/317,812, filed on Mar. 26, 2010, provisional application No. 61/317,793, filed on Mar. 26, 2010.

(51) Int. Cl.
*G06F 3/12* (2006.01)
*G06K 15/00* (2006.01)

(52) U.S. Cl.
CPC ............ *G06F 3/1204* (2013.01); *G06F 3/1205* (2013.01); *G06F 3/1238* (2013.01); *G06F 3/1285* (2013.01); *G06F 3/1292* (2013.01); *G06F 3/1294* (2013.01)

(58) Field of Classification Search
None
See application file for complete search history.

(56) References Cited

U.S. PATENT DOCUMENTS

| | | | |
|---|---|---|---|
| 8,786,875 B1* | 7/2014 | Khafizova | G06F 3/1204 358/1.13 |
| 8,964,235 B1* | 2/2015 | Khafizova | G06F 3/1204 358/1.13 |
| 2004/0137855 A1* | 7/2004 | Wiley | G06F 3/1204 455/88 |

* cited by examiner

*Primary Examiner* — Dov Popovici
(74) *Attorney, Agent, or Firm* — Haynes and Boone, LLP (57) ABSTRACT

The illustrative embodiments described herein provide systems and methods for printing a document from a mobile communication device. In one embodiment, the method includes receiving a print job sent from the mobile communication device and determining a location of the mobile communication device. The method also includes identifying a printer proximate the mobile communication device and initiating execution of the print job at the identified printer.

20 Claims, 8 Drawing Sheets

SYSTEMS AND METHODS FOR PRINTING A DOCUMENT FROM A MOBILE COMMUNICATION DEVICE

CROSS REFERENCE TO RELATED APPLICATIONS

The present patent application is a continuation of patent application Ser. No. 14/334,338, filed Jul. 17, 2014, now issued U.S. Pat. No. 8,964,235, issued on Feb. 24, 2015, which is a continuation of patent application Ser. No. 12/753,163, filed Apr. 2, 2010, now issued U.S. Pat. No. 8,786,875, issued on Jul. 22, 2014, which is a non-provisional of patent application No. 61/317,741, filed Mar. 26, 2010, entitled System and Method for Analysing Data Records Utilizing a Touch Screen Interface, and provisional patent application No. 61/317,744, filed Mar. 26, 2010, entitled Touch Screen Commands, and provisional patent application No. 61/317,793, filed Mar. 26, 2010, entitled A Method for Touch Detection in Touch Sensitive Screens, and provisional patent application No. 61/317,800, filed Mar. 26, 2010, entitled Touch Sensitive Screens Utilizing History and a Preview, and provisional patent application No. 61/317,812, filed Mar. 26, 2010, entitled Repetitive Touch Combining Method, and provisional patent application No. 61/317,827 filed Mar. 26, 2010, entitled Touch Screen Accuracy, the entire contents of each of these applications are incorporated by reference herein. The instant patent application is related to commonly assigned patent application Ser. No. 12/753,167, filed on Apr. 2, 2010, entitled Method and Apparatus of Compiling Multimedia Files and Related Data Retrieval Operations, and patent application Ser. No. 12/753,171, filed on Apr. 2, 2010, entitled Method and Apparatus of Processing Information in an Environment With Multiple Devices and Limited Resources, and patent application Ser. No. 12/753,180, filed Apr. 2, 2010, entitled Systems and Methods for Managing the Execution of Print Jobs, now issued U.S. Pat. No. 8,559,036, issued on Oct. 15, 2013, the entire contents of each of these applications are incorporated by reference herein.

BACKGROUND

1. Field of the Invention

The present invention relates generally to systems and methods for printing a document. More particularly, the present invention relates to systems and methods for printing a document from a mobile communication device.

2. Description of the Related Art

Today's society has become highly interconnected as a result of the increasing prevalence of mobile communication devices. People are now able to rely on mobile communication devices to perform an increasing number of daily tasks, such as talking to others, texting, web browsing, e-mailing, organizing, taking pictures, etc. However, because mobile communication devices are not anchored to any particular location, some issues may arise when using mobile communication devices to print a document. For example, as a user carries his or her mobile communication device from one location to another, the printer that is most conveniently accessible to the user may also change. The user may be inconvenienced by having to retrieve a printed document at the user's default printer since the user could be far away from his or her home, office, or other customary location. In contrast, the user may desire to use his or her mobile communication device to print the document, according to his or her specifications, at a closer or more conveniently-located printer.

SUMMARY

The illustrative embodiments described herein are directed to a data processing system and, in particular, to systems and methods for printing a document from a mobile communication device. In one embodiment, the method includes receiving a print job sent from the mobile communication device and determining a location of the mobile communication device. The method also includes identifying a printer proximate the mobile communication device and initiating execution of the print job at the identified printer.

In another embodiment, the method includes receiving a print job sent from a mobile communication device, accessing a user profile associated with the user, and identifying a set of printers compatible with the user profile. The method also includes identifying a destination printer in the set of printers that is proximate the mobile communication device and initiating execution of the print job at the destination printer.

In another embodiment, a printer includes a receiver to receive a print job initiated by a mobile communication device associated with a user. The print job includes a set of print job parameters, and the set of print job parameters includes user identification data. The printer also includes a detector to detect a presence of the mobile communication device, and a printing module to print the document when the presence of the mobile communication device is detected.

DETAILED DESCRIPTION

Figure 1:
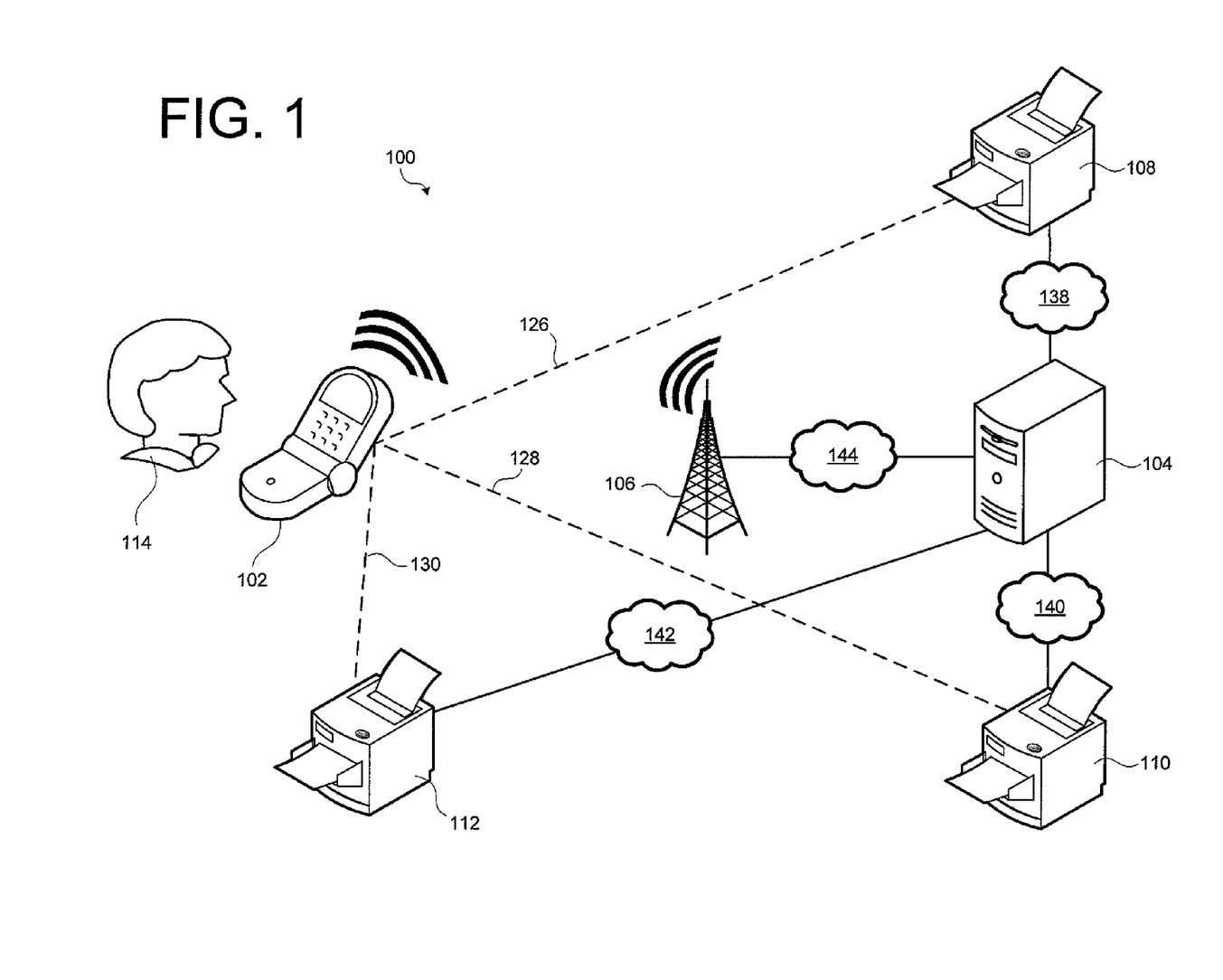
FIG. 1 is a schematic, pictorial representation of a network data processing system for printing a document using a mobile communication device according to an illustrative embodiment.
Figure 2:
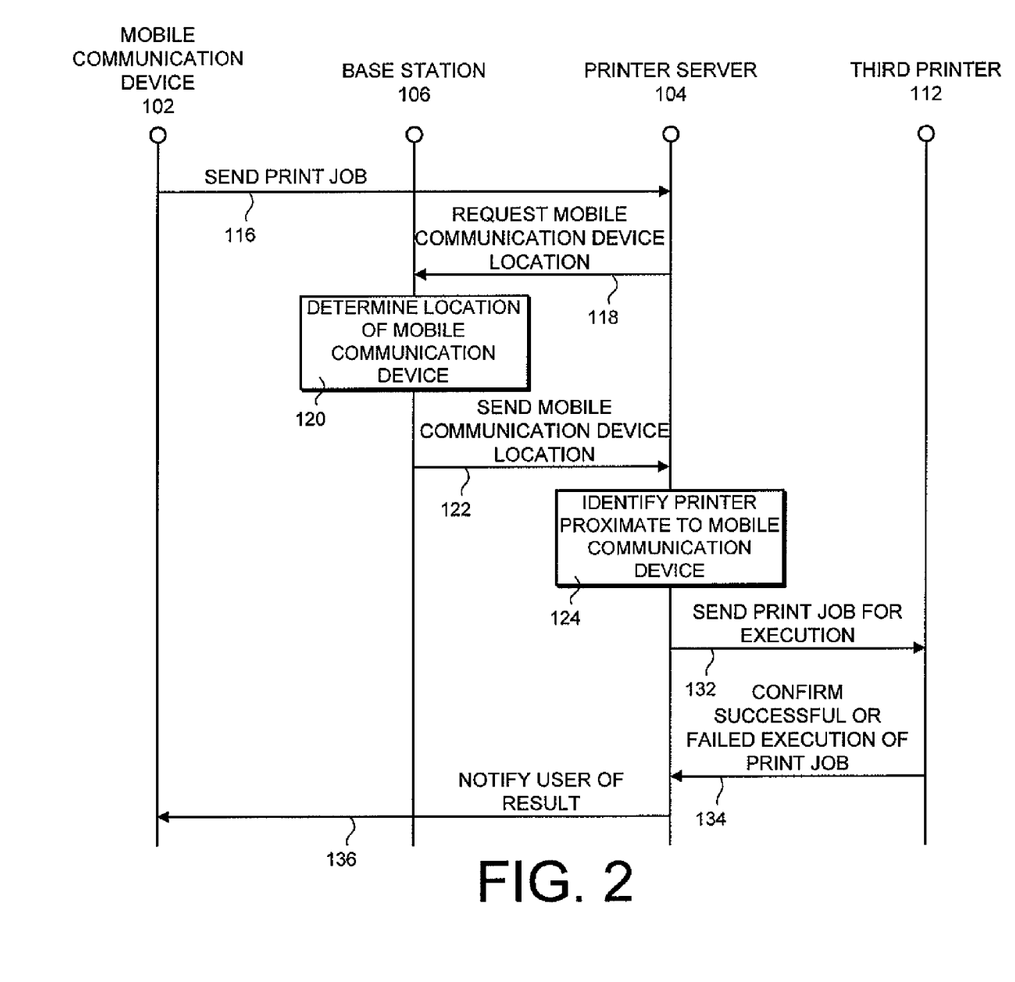
FIG. 2 is a schematic diagram showing an illustrative embodiment of the interaction between components of a system for printing a document using a mobile communication device.

Referring to FIGS. 1 and 2, an illustrative embodiment of a network data processing system 100 includes a mobile communication device 102 that is in data communication with a printer server 104 via a base station 106. The mobile communication device 102 is any mobile device capable of communicating with a user or another device. Unless otherwise indicated, as used herein, "or" does not require mutual exclusivity. Non-limiting examples of the mobile communication device 102 include cellular phones, smart phones, walkie talkies, laptops, netbooks, personal digital assistants, mini-computers, digital music players, portable gaming devices, etc. The printer server 104 is in data communication with a first printer 108, a second printer 110, and a third printer 112, although any number of printers may communicate with the printer server 104.

In one embodiment, a user 114 of the mobile communication device 102 sends a print job to the printer server 104, which then identifies the printer that is most proximate the mobile communication device 102. In the example of FIG. 1, the most proximate printer that is identified by the printer server 104 is the third printer 112. The printer server 104 may then initiate the print job on the third printer 112, where the user's 114 desired document is printed and retrieved. Thus, the document is printed at a location that is convenient, or otherwise desirable, to the user 114 even as the location of the mobile communication device 102 and the user 114 changes.

The interaction between the components of the network data processing system 100 is shown according to one illustrative embodiment with reference to both FIGS. 1 and 2. After receiving the print job from the mobile communication device 102 via the base station 106 (data communication 116), the printer server 104 may request the location of the mobile communication device 102 from the base station 106 (data communication 118), including any number of servers (not shown) that is associated with the base station 106 and has functionality that is able to locate the mobile communication device 102. The printer server 104 may request the location of the mobile communication device 102 upon receiving the print job, or at a later time. The base station 106 then determines the location of the mobile communication device 102 (process 120). Non-limiting examples of techniques that may be used by the base station 106 to determine the location of the mobile communication device 102 are given in the figures below.

Upon determining the location of the mobile communication device 102, the base station 106, or associated server (not shown), sends the mobile communication device location to the printer server 104 (data communication 122). Amongst the printers with which the printer server 104 is in data communication, the printer server 104 may identify the printer that is most proximate the mobile communication device 102 (process 124). In one embodiment of the process 124, the printer server 104 determines a respective distance between the mobile communication device 102 and each of the first printer 108, the second printer 110, and the third printer 112. In particular, the printer server 104 determines that the mobile communication device 102 is a first distance 126, a second distance 128, and a third distance 130 from the first printer 108, the second printer 110, and the third printer 112, respectively. The printer server 104 compares the first distance 126, the second distance 128, and the third distance 130 to determine that the third printer 112 is the least distant printer from the mobile communication device 102.

Upon identifying the third printer 112 as being most proximate the mobile communication device 102, the printer server 104 sends the print job to the third printer 112 for execution (data communication 132). In another embodiment, execution of the print job by the third printer 112 is initiated by the printer server 104, and the print job is sent to the third printer 112 from a source other than the printer server 104, such as the mobile communication device 102 itself.

Before actually printing the document associated with the print job, the printer server 104 may initiate an authorization prompt on the mobile communication device 102 that requests the user 114 to authorize printing of the document at the third printer 112. Thus, the user 114 may prevent the third printer 112 from printing the document for any reason. One non-limiting example of when a user 114 may desire to prevent printing at the third printer 112 is when the third printer 112 is not the default printer that is normally designated for printing documents for the mobile communication device 102. For example, the printer server 104 may determine that the user's default printer (e.g., the first printer 108) is unavailable, and choose to initiate the print job on a different printer (e.g., the third printer 112). The default printer may be unavailable, for example, if the mobile communication device 102 is out of range from the default printer or a computer associated therewith. In addition to requesting the user 114 to authorize print jobs for a printer other than the user's default printer, the user 114 may be requested to authorize printing at the user's default printer as well.

Depending on whether the third printer 112 successfully executed the print job, the third printer 112 notifies the printer server 104 whether or not the document was printed successfully (data communication 134). In response to receiving this notification from the third printer 112, the printer server 104 may then initiate a notification on the mobile communication device 102 that notifies the user 114 of the success or failure of the print job (data communication 136). If the print job was successful, the user 114, or any other person, may retrieve the printed document at the third printer 112. Thus, time may be saved and convenience may be increased by printing the document at the proximate third printer 112.

The techniques, technologies, or media by which the components of the network data processing system 100 intercommunicate are numerous. For example, the printer server 104, the first printer 108, the second printer 110, and the third printer 112 may be part of a personal area network (PAN), a local area network (LAN), a campus area network (CAN), a metropolitan area network (MAP), or any other network type. Also, data communication media 138, 140, and 142 between the printer server 104 and each of the first printer 108, the second printer 110, and the third printer 112, respectively, may be any media through which data can be communicated. For example, the data communication media 138, 140, and 142 may be wired or wireless data connections, and may utilize a virtual private network (VPN), multi-protocol label switching (MPLS), the Internet, or any other data communication media. In addition, each of the data communication media 138, 140, and 142 may be of the same type, or may differ from one another.

The data communication medium 144 between the base station 106 and the printer server 104 may be of the same or similar type as any of the non-limiting examples provided for the data communication media 138, 140, and 142. The data communication medium 144 may also include any number of intervening servers or computers (not shown), which may facilitate the communication of data between the base tower 106 and the printer server 104. Such intervening servers may also assist in determining the location of the mobile communication device 102 and relay that location, as well as other information regarding the mobile communication device 102 or the user 114, to the printer server 104 for processing in accordance with the illustrative embodiments. Wireless communication between the mobile communication device 102 and the base station 106 may utilize any wireless standard for communicating data, such as CDMA (e.g., cdmaOne or CDMA2000), GSM, 3G, Edge, an over-the-air network, Bluetooth, etc.

In one example, the network data processing system 100 may utilize the Internet, with any combination of the data communication media 138, 140, 142, and 144 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. FIG. 1 is intended as an example, and not as an architectural limitation for the different illustrative embodiments.

Figure 3:
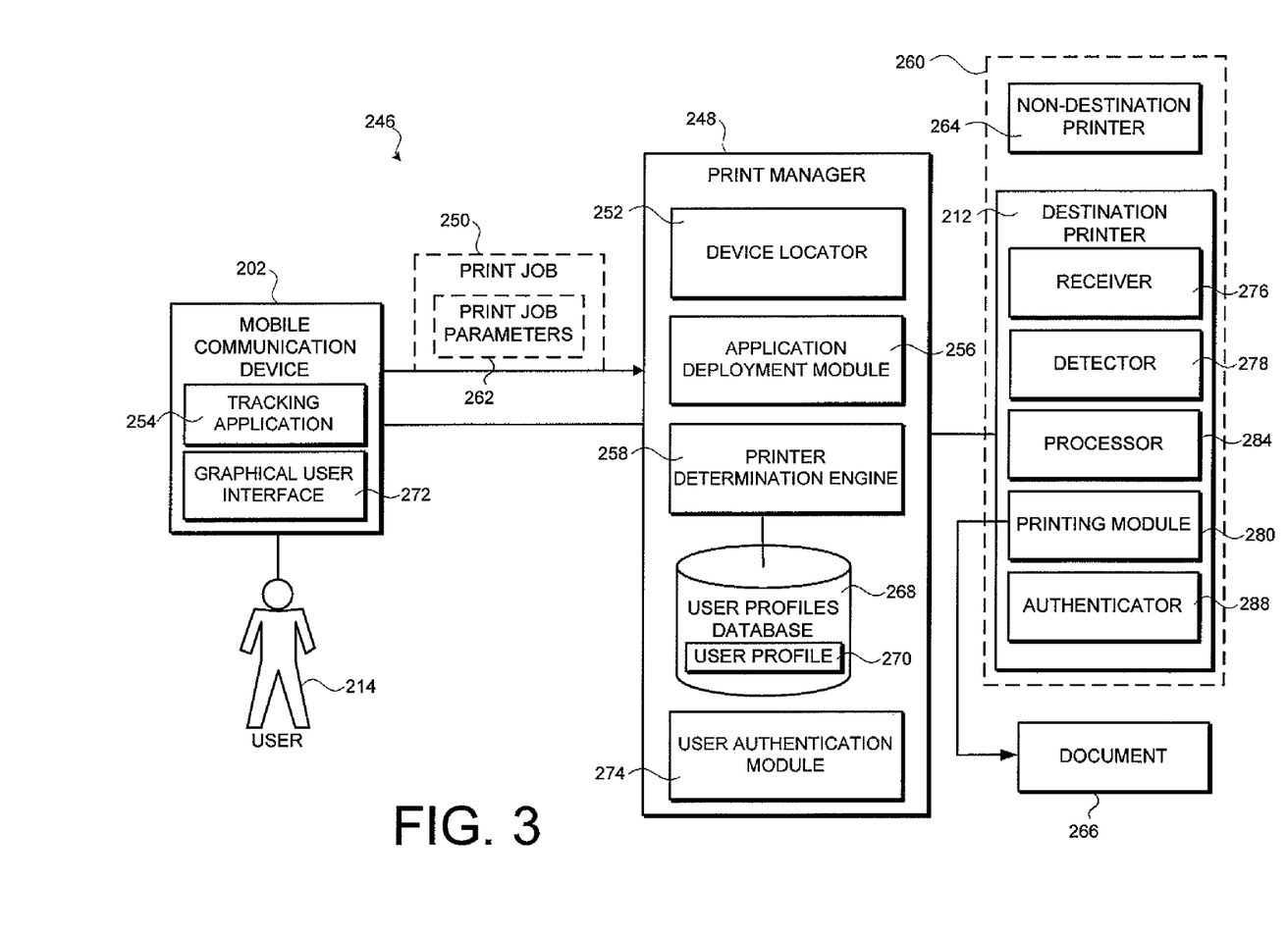
FIG. 3 is a schematic, block diagram of a location-based print management system according to an illustrative embodiment.
Figure 4:
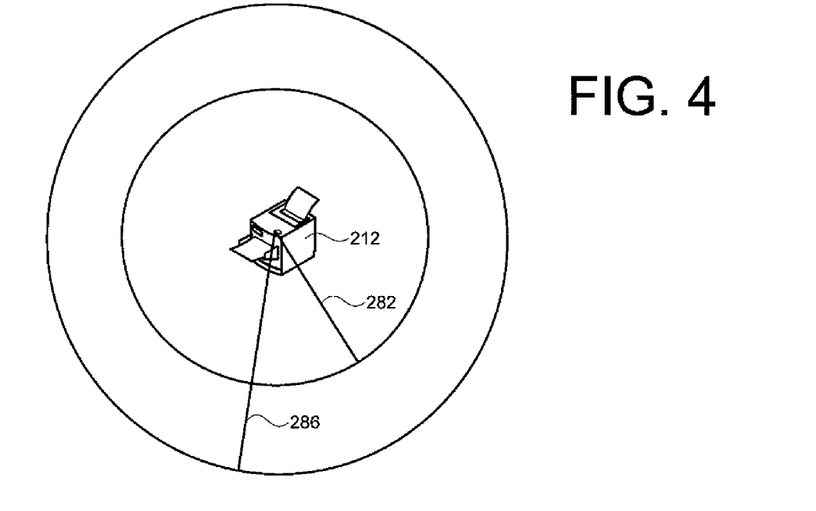
FIG. 4 is a schematic diagram illustrating an initiation distance and a print activation distance around a printer according to an illustrative embodiment.

Referring now to FIGS. 3 and 4, an illustrative embodiment of a location-based print management system 246 includes a print manager 248 that receives one or more print jobs 250 from the mobile communication device 202, and initiates the print job 250 on a destination printer 212 based, at least in part, on a current or future location of the mobile communication device 202. Components of FIG. 3 that are analogous to components in FIG. 1 have been shown by indexing the reference numerals by 100. In the example of FIG. 3, the destination printer 212 is one of a set of printers 260 from which a print destination may be selected, and is the printer that is identified by the print manager 248 for executing the print job 250. The print manager 248 may be implemented by a server, such as the printer server 104 in FIG. 1, which is in communication with the set of printers 260.

The print job 250 may be created, initiated, or sent by the mobile communication device 202 using any application having print functionality, such as a word processor, a graphical-related application, a spreadsheet application, a Web browser, or other print-capable application. The print manager 248 may initiate execution of the print job 250 upon receiving the print job 250, or at any other time thereafter. For example, if the user 214 specifies that the print job 250 should be executed at a particular date or time in the future, the print manager 248 may initiate the print job 250 at the destination printer 212 at the time or date specified by the user 214.

Once the print manager 248 has determined that the print job 250 should be initiated, a device locator 252 determines a location of the mobile communication device 202. The device locator 252 may work in conjunction with a base station, such as the base station 106 in FIG. 1, or a network data processing system to locate the mobile communication device 202. The technologies that may be used to locate the mobile communication device 202 are numerous, and several examples follow.

In one non-limiting example, a location-based service may be used to locate the mobile communication device 202, such as cell identification, enhanced cell identification, uplink-time difference of arrival (U-TDOA), time of arrival (TOA), angle of arrival (AOA), enhanced-observed time difference (E-OTD), or assisted GPS. Localization-based systems that may be used to locate the mobile communication device 202 may include network based systems, such as cell identification or triangulation, handset-based systems, or hybrid positioning systems, such as assisted GPS. In the example in which a handset-based system is used to locate the mobile communication device 202, a tracking application 254 may be loaded onto the mobile communication device 202. The tracking application 254 may be deployed by an application deployment module 256. One non-limiting example of the tracking application 254 is a GPS module that calculates and sends location data, such as the latitude and longitude, for the mobile communication device 202 to the print manager 248.

The print manager 248 also includes a printer determination engine 258, which, in one embodiment, identifies a printer at which the print job 250 is to be initiated. In addition to identifying the destination printer 212 on the basis of proximity to the mobile communication device 202, the printer determination engine 258 may also take into account a set of print job parameters 262 associated with the print job 250. For example, the printer determination engine 258 may identify the set of printers 260 that is capable of performing the print job 250 based on the print job parameters 262, and then identify the destination printer 212 to be the printer in the set of printers 260 that is most proximate the mobile communication device 202. The set of printers 260 includes one or more printers, which, in the example of FIG. 3, includes the destination printer 212 and a non-destination printer 264.

The set of print job parameters 262 includes one or more print job parameters. Examples of the print job parameters 262 that may be associated with the print job 250 are numerous. One example of a print job parameter 262 is a file location of the document 266 to be printed. In the case in which the document 266 resides on the mobile communication device 202, such as when the document 266 is an attachment to an e-mail on the mobile communication device 202, the document 266 may be sent from the mobile communication device 202 to the print manager 248 along with the print job 250, or the print job parameters 262 may specify the location of the document 266 on the mobile communication device 202. The print job parameters 262 may also specify the file location of the document 266 on the Internet, or a directory that is local, or otherwise accessible, to a server that receives the print job 250. The file location of the document 266 may also include a unique identification number such as an IP address. In the case in which the document 266 is accessible via the Internet, the print manager 248 may search for and find the document 266 on the Internet by initiating a web search. The print job parameters 262 may also specify the location of the document 266 on any computer that is in communication with the computer on which the print manager 248 is implemented.

Other examples of the print job parameters 262 include settings related to how the document 266 is printed, such as the desired color option (e.g., grayscale, black-and-white, color, etc.), the layout of the document 266 (e.g., portrait, landscape, etc.), the number of pages to be printed on each sheet of paper, the number of sides on which to print the document 266 (e.g., two-sided print, single side print, etc.), and other settings for the document 266. The print job parameters 262 may also indicate the printer type, such as a laser printer, a dot matrix printer, a plotter, etc. When the printer determination engine 258 identifies the set of printers 260 that are capable of printing the document 266, the printer determination engine 258 may take into account the document print options, such as those given above. For example, if the print job parameters 262 indicate that the document 266 is to be printed on a dot matrix printer in black-and-white, the set of printers 260 that are identified by the printer determination engine 258 will be dot matrix printers having black-and-white print capability. By way of further example, if the print job parameters 262 indicate that the document 266 is to be printed in color, the printer determination engine 258 identifies the set of printers 260 that are capable of color printing.

The print job parameters 262 may also include, or otherwise indicate, the urgency of the print job 250 or the expected pickup time. When the print job parameters 262 indicate that the print job 250 is urgent, the printer determination engine 258 may identify the set of printers 260 that are immediately available to print the document 266. The expected pickup time may include an amount of time after sending the print job 250 that the user 214 would like to retrieve the document 266. The expected pickup time may also indicate a future date or time at which the user 214 would like the document 266 to be printed. In the case in which the print job parameters 262 include an expected pickup time, the print manager 248 may wait until such expected pickup time to locate the mobile communication device 202, identify the destination printer 212, and initiate printing on the destination printer 212. Indicating an expected pickup time may be useful, for example, when the document 266 is subject to multiple revisions or updates, and the user 214 prefers to print the most recent version of the document 266 at a future time. In this case, the print job parameters 262 may also include the file location of the document 266 so that the proper document is accessed. The print job parameters 262 may also include user identification data that identifies the user 214.

The print job parameters 262 may also indicate the location of the mobile communication device 202. For example, when the tracking application 254 includes a GPS module, the print job parameters 262 may indicate the coordinates at which the mobile communication device 202 is located. By way of further example, the network in which the location-based print management system 246 is implemented may be partitioned into zones that correspond to a certain range of distance from a predefined point, such as the server on which the print manager 248 is implemented, or one or more printers in the network. Based on the zone indicated by the print job parameters 262, the printer determination engine 258 may identify the printer (e.g., the destination printer 212) that is within, or closest to, that zone. The printer determination engine 258 may also ensure that the identified printer is capable of printing the document 266 based on other print job parameters 262.

In one embodiment, after identifying the set of printers 260 that is capable of executing the print job 250 based on the print job parameters 262, the printer determination engine 258 may then determine a respective distance between the mobile communication device 202 and each of the set of printers 260. The printer determination engine 258 may then identify the destination printer 212 as being the printer in the set of printers 260 that is least distant from the mobile communication device 202. Upon identifying the destination printer 212 as most proximate the mobile communication device 202, the print manager 248 may initiate execution of the print job 250 on the destination printer 212.

In another illustrative embodiment, the printer determination engine 258 may identify the set of printers 260 on which the document 266 may be printed by accessing a user profile database 268. The user profile database 268 includes a user profile 270 associated with the user 214. The user profile 270 includes data about the user 214. For example, the user profile 270 may include print preferences of the user 214, passwords to access printing on a particular printer, the maximum distance the user 214 is willing to travel to retrieve the document 266, user identification data, and other user specific data. As will be described in further detail in FIG. 5, the user profile 270 may also include user-specific financial information, such as credit card numbers and account information, for when the destination printer 212 is owned or operated by a vendor of printing services.

The printer determination engine 258 may use either or both of the print job parameters 262 or the user profile 270 to identify the set of printers 260 on which the document 266 could potentially be printed. Amongst the printers in the set of printers 260, the printer determination engine 258 may then identify the printer most proximate the mobile communication device 202, which, in the example of FIG. 3, is the destination printer 212. In another embodiment, the printer determination engine 258 may identify the most proximate printer (e.g., the destination printer 212) without regard to the print job parameters 262 or the user profiles 270.

Once the destination printer 212 is identified by the printer determination engine 258, a user authentication module 274 may initiate an authorization prompt on the graphical user interface 272 of the mobile communication device 202. The authorization prompt may require the user 214 to approve printing of the document 266 on the destination printer 212. Upon receiving such approval from the user 214, the print manager 248 may initiate execution of the print job 250 on the destination printer 212.

The destination printer 212 includes a receiver 276 for receiving the print job 250. In one embodiment, the destination printer 212 also includes components that authenticate or detect the presence of the mobile communication device 202 prior to printing the document 266. For example, the destination printer 212 may include a detector 278 to detect the presence of the mobile communication device 202. Upon receiving the print job 250, a printing module 280, which may include print components such as toner, spools, paper, ink, etc., may print the document 266 when the detector 278 detects the presence of the mobile communication device 202.

With reference to both FIGS. 3 and 4, in one embodiment, the printing module 280 may print the document 266 when the detector 278 detects that the mobile communication device 202 is within a print activation distance 282 from the destination printer 212. The processor 284 may also be used to determine when the mobile communication device 202 is within the print activation distance 282. By way of example, printing the document 266 when the mobile communication device 202 is within the print activation distance 282 helps to ensure that the document 266 is printed when the user 214 is near the destination printer 212. By way of further illustration, the mobile communication device 202 may initiate or send the print job 250 to the print manager 248 while the mobile communication device 202 is at an initiation distance 286 from the destination printer 212. After the print manager 248 identifies the destination printer 212, the mobile communication device 202 may move at or within the print activation distance 282 from the destination printer 212, at which point the print job 250 is initiated on the destination printer 212. The print activation distance 282 may be specified by the user 214 or any other source. In one example, the print job parameters 262 or the user profile 270 indicates the print activation distance 282. In another example, the destination printer 212 is preset to include the print activation distance 282.

In another embodiment, the destination printer 212 may also include an authenticator 288 to determine whether the print job 250 is associated with the user 214. In this embodiment, the authenticator 288 compares user identification data, which may be indicated by the print job parameters 262 or the user profile 270, with a mobile communication device that is detected by the detector 278. If the user identification data matches that of the detected mobile communication device or associated user, the print job 250 is authenticated and will be executed by the destination printer 212. Thus, the authenticator 288 help to prevent a user other than the user 214 from initiating the print job 250 simply by moving within the print activation distance 282 from the destination printer 212. Instead, only the user 214 having the mobile communication device 202 may activate printing of the document 266 by moving within the print activation distance 282 from the destination printer 212. Authentication may take place using any wireless protocol, such as Bluetooth.

In another embodiment, the user 214 may be authenticated by placing a phone call to a predetermined phone number or destination, such as an interactive voice response (IVR) system. Upon connection to the IVR system or upon transmission of data to the IVR system, the user 214 may be authenticated and the document 266 may be printed at the destination printer 212. Any of the components described for the destination printer 212 may be included in any printer in the set of printers 260.

The print manager 248 may also notify the user 214 as to whether the print job 250 was successfully executed on the destination printer 212. In the case in which the print job 250 was not successfully executed, the print manager 248 may initiate a prompt on the mobile communication device 202 requesting the user 214 to change or loosen his or her printing preferences or settings, such as those contained in the print job parameters 262 or the user profile 270. Also, in one embodiment, a copy of the print job 250, the print job parameters 262, or the document 266 may be retained on the mobile communication device 202 even after the print job 250 is sent to the print manager 248. The print job 250, the print job parameters 262, or the document 266 may be discarded when execution of the print job 250 is successful.

Figure 5:
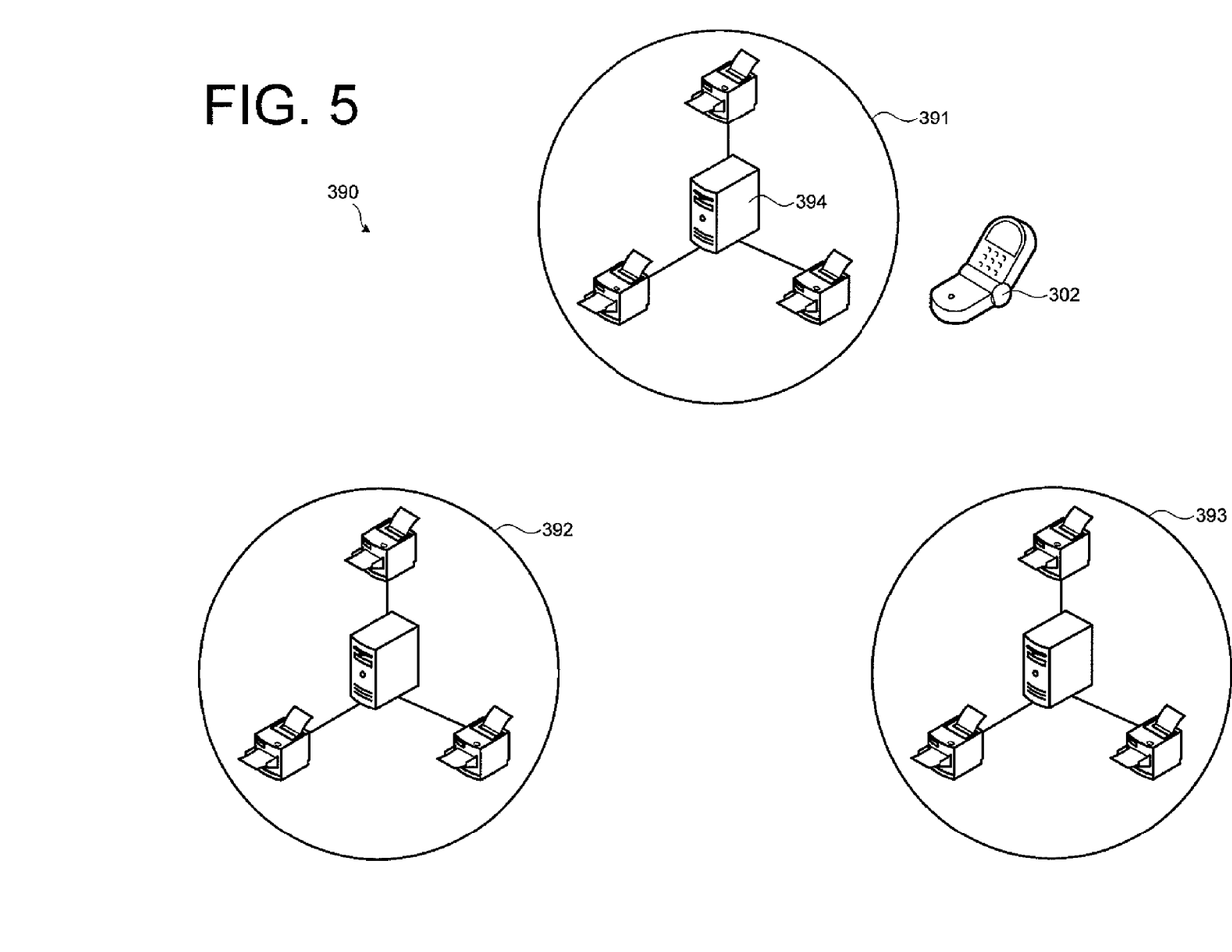
FIG. 5 is a schematic diagram showing multiple local area networks in which the illustrative embodiments may be implemented.

Referring to FIG. 5, an illustrative embodiment of a network data processing environment 390 in which the illustrative embodiments may be implemented includes a first local area network (LAN) 391, a second LAN 392, and a third LAN 393. However, any number of LANs may be included in the network data processing environment 390. A user may initiate a print job from the mobile communication device 302 within the network data processing environment 390. A server, such as the server 104 in FIG. 1, may then determine a location of the mobile communication device 302 and identify the LAN that is most proximate the mobile communication device 302. The server may also identify the LAN that is available to the mobile communication device 302 for printing based on print job parameters and a user profile. In the example of FIG. 5, the LAN that is most proximate the mobile communication device 302 is the first LAN 391. Upon identifying the first LAN 391, a server 394 may identify a destination printer within the first LAN 391 on which to execute the print job sent from the mobile communication device 302. The identification of the destination printer on which to execute the print job may be implemented in accordance with the illustrative embodiments.

The ability of the illustrative embodiments to execute a print job within an environment containing multiple LANs helps to give the user of the mobile communication device 302 greater mobility and flexibility when printing a document. For example, the first LAN 391, the second LAN 392, and the third LAN 393 may be owned, operated, or associated with an organization to which the user of the mobile communication device 302 is employed or otherwise associated. In this case, each of the LANs in the network data processing environment 390 may represent offices or separate physical locations of the organization. Thus, when the user of the mobile communication device 302 travels to any of the offices or physical locations of the organization, he or she will be able to print at that location using the illustrative embodiments. By way of specific example, the first LAN 391 may be located at a Los Angeles office of the organization, and the second LAN 392 may be located at a Dallas office of the organization. If the user of the mobile communication device 302 normally works at the Dallas office, the user will still be able to print at the Los Angeles office if he or she is there for any reason. Also, if the user initiates a print job at the Dallas office but specifies that the print job should be executed at a future time, such as when he or she expects to be in the Los Angeles office, the illustrative embodiments will detect the location of the mobile communication device 302 at the time the print job is set to be initiated, and will therefore identify a printer in the first LAN 391 that is proximate the mobile communication device 302. If the document to be printed is subject to multiple revisions or updates, a file location can be specified for the print job so that when the user of the mobile communication device 302 needs to pick up the document at the Los Angeles office, the document will be the most recent version and be available for immediate use by the user.

Any of the LANs in the network data processing environment 390 may also represent LANs that are owned or operated by a vendor of printing services, such as FedEx Office, Kinko's, or any other vendor. Since some vendors require an account or payment information, such information may be stored in the user profile for the user of the mobile communication device 302 for access by the vendor. Account or payment information may also be included in the print job parameters associated with the print job. Thus, in an example in which the first LAN 391 is a vendor, the vendor will access the user's account or payment information so that the print job may be executed at the first LAN 391. Because some vendors charge a fee for printing services, the user of the mobile communication device 302 may be given an opportunity to approve or disapprove execution of the print job at the vendor using a user authentication module, such as the user authentication module 274 in FIG. 3. In other embodiments, any of the first LAN 391, the second LAN 392, or the third LAN 393 may be a personal area network (PAN), a campus area network (CAN), a metropolitan area network (MAN), or any other network.

Figure 6:
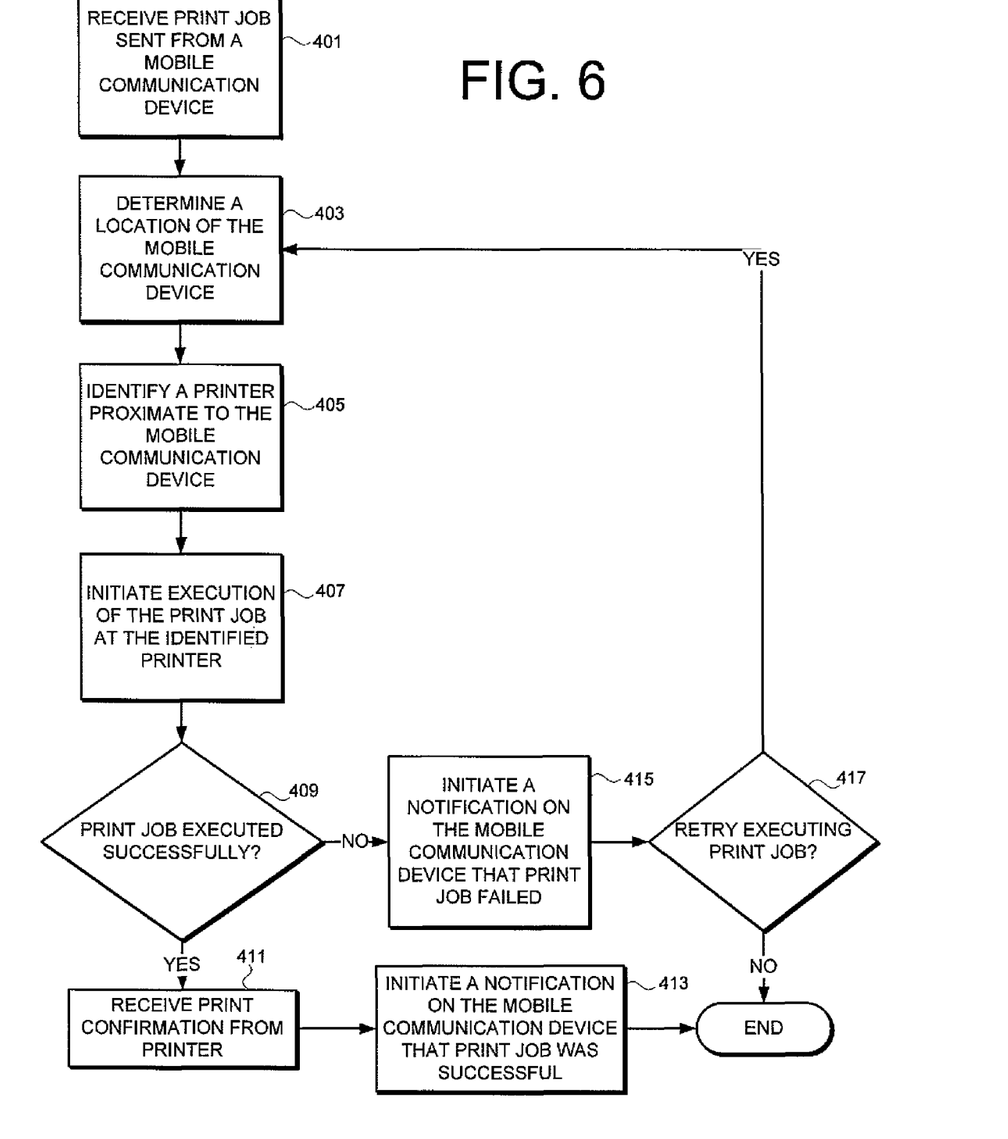
FIG. 6 is a schematic flowchart of a process for printing a document using a mobile communication device according to an illustrative embodiment.

Referring to FIG. 6, an illustrative embodiment of a process that may be executed by the print manager 248 in FIG. 3 includes receiving a print job sent from a mobile communication device (step 401). The process determines a location of the mobile communication device (step 403). The process also identifies a printer proximate the mobile communication device (step 405). The process initiates execution of the print job at the identify printer (step 407).

The process determines whether the print job was successfully executed (step 409). If the process determines that the print job was successfully executed, the print job receives a print confirmation from the printer (step 411). The process then initiates a notification on the mobile communication device that the print job was successful (step 413). The process then terminates.

Referring back to step 409, if the process determines that the print job was not successfully executed, the process initiates a notification on the mobile communication device that the print job has failed (step 415). The process then determines whether to retry executing the print job (step 417). If the process determines to retry executing the print job, the process returns to step 403. If the process determines not to retry executing the print job, the process then terminates.

Figure 7:
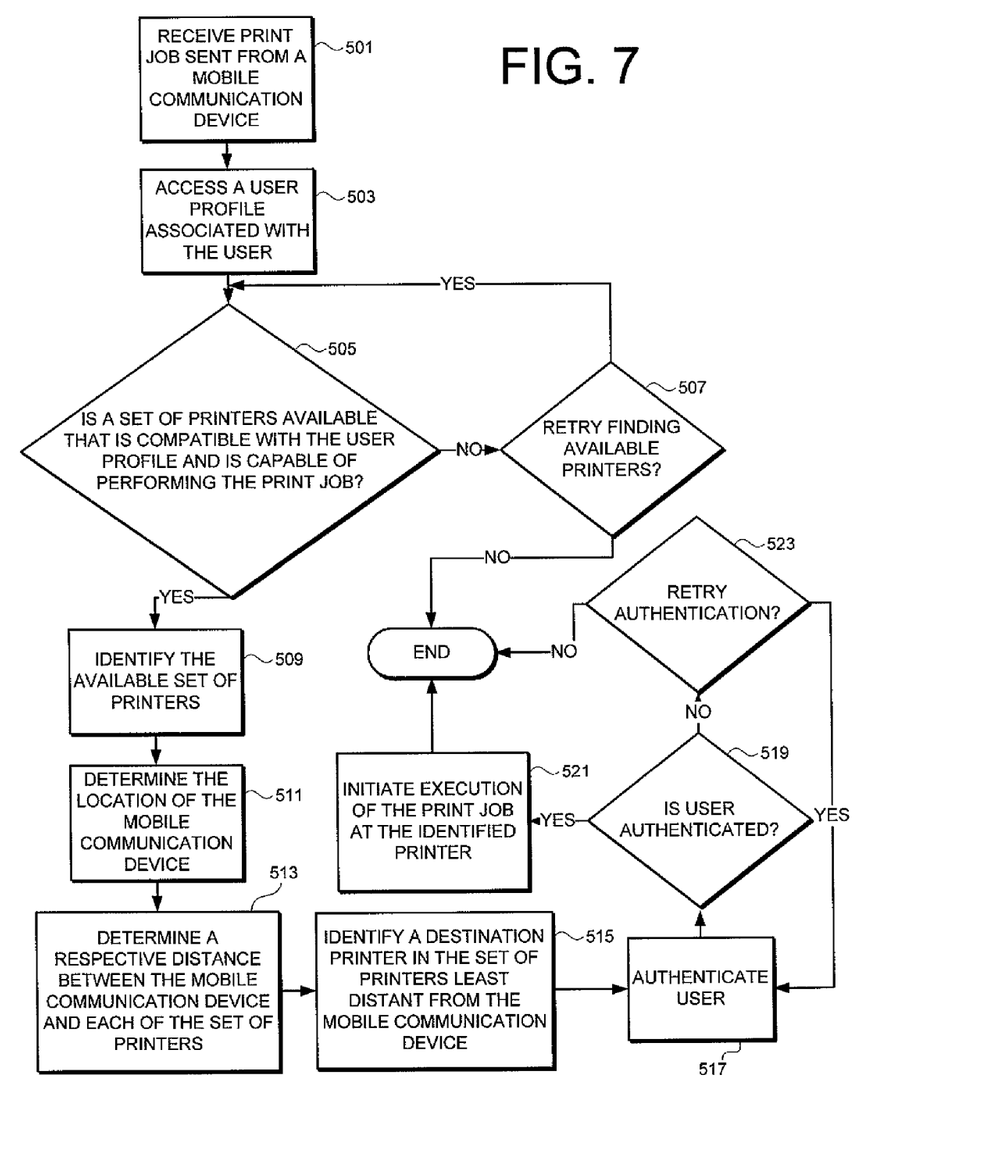
FIG. 7 is a schematic flowchart of a process for printing a document using a mobile communication device according to another illustrative embodiment.

Referring to FIG. 7, another illustrative embodiment of a process that may be implemented by the print manager 248 in FIG. 3 includes receiving a print job sent from a mobile communication device (step 501). The process accesses a user profile associated with the user (step 503). The process then determines if a set of printers is available that is compatible with the user profile and is capable of performing the print job based on print job parameters (step 505). If the process determines that no such set of printers is available, the process determines whether to retry finding the available printers (step 507). If the process determines not to retry finding available printers, the process terminates. If the process determines to retry finding available printers, the process then returns to step 505.

Returning to step 505, if the process determines that a set of printers is available that is compatible with the user profile and is capable of performing the print job, the process identifies the available set of printers (step 509). The process then determines the location of the mobile communication device (step 511). The process determines a respective distance between the mobile communication device and each of the set of available printers (step 513). The process identifies a destination printer in the set of available printers that is least distant from the mobile communication device (step 515).

The process authenticates the user (step 517). The process determines whether the user is authenticated (step 519). If the process determines that the user is authenticated, the process initiates execution of the print job at the identified destination printer (step 521). The process then terminates.

Returning to step 519, if the process determines that the user has not been authenticated, the process determines whether to retry authentication (step 523). If the process determines to retry authentication, the process returns to step 517. If the process determines not to retry authentication, the process terminates.

Figure 8:
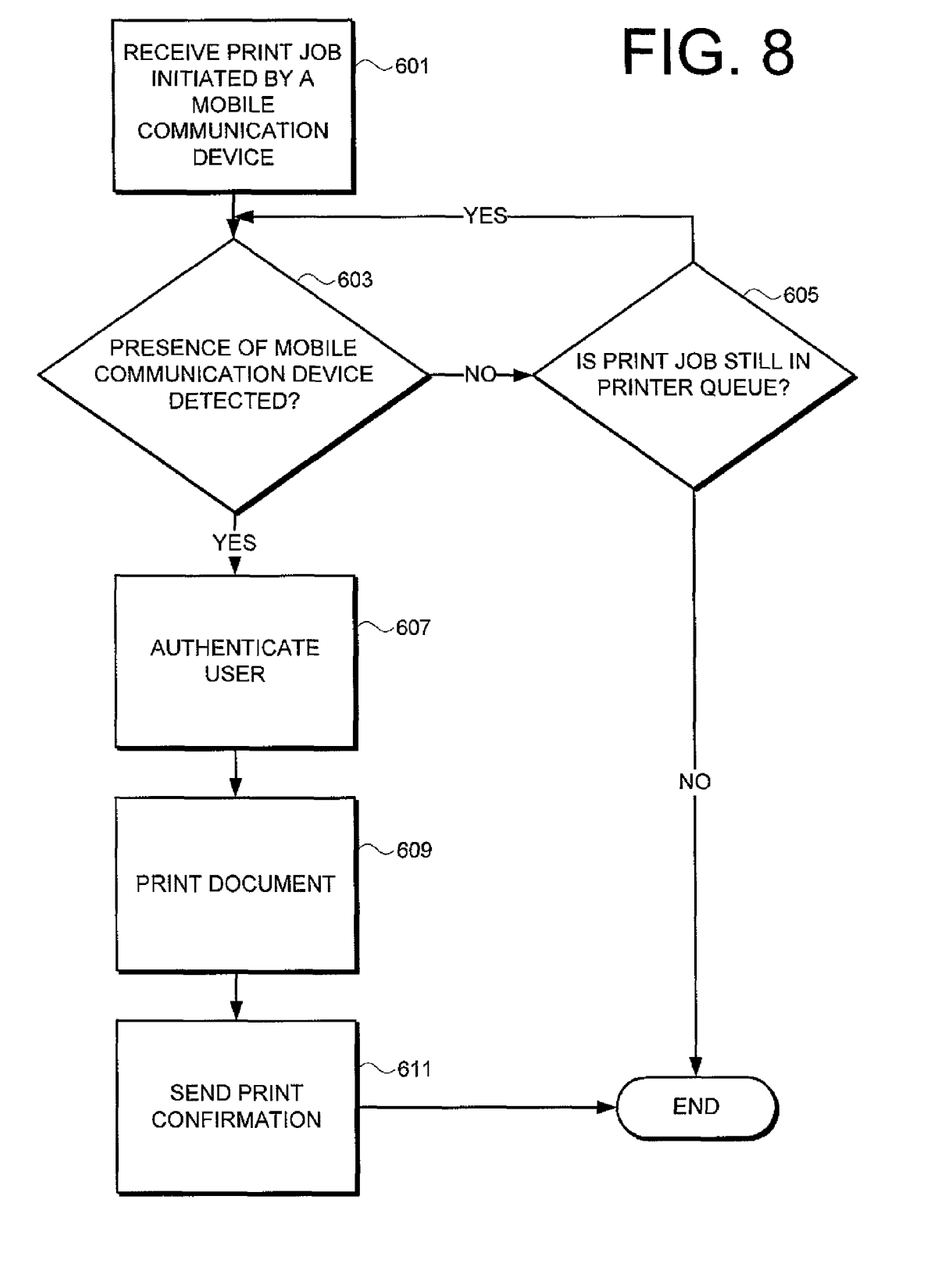
FIG. 8 is a schematic flowchart of a printer process to execute a print job initiated by a mobile communication device according to an illustrative embodiment.

Referring to FIG. 8, an illustrative embodiment of a process that may be implemented by a printer, such as the destination printer 212 in FIG. 3, includes receiving a print job that has been initiated by a mobile communication device (step 601). The process determines whether the presence of the mobile communication device has been detected (step 603). If the process determines that the presence of the mobile communication device has not been detected, the process determines whether the print job is still in the printer queue (step 605). If the print job is still in the printer queue, the process returns to step 603. If the process determines that the print job is no longer in the printer queue, the process terminates.

Returning to step 603, if the process determines that the presence of the mobile communication device has been detected, the process authenticates the user (step 607). The process prints the document (step 609). The process sends a print confirmation (step 611). The process then terminates.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the Figures. For example, in some cases, two blocks shown in succession may be executed substantially concurrently, or the blocks may sometimes be executed in the reverse order, depending upon the functionality involved.

Figure 9:
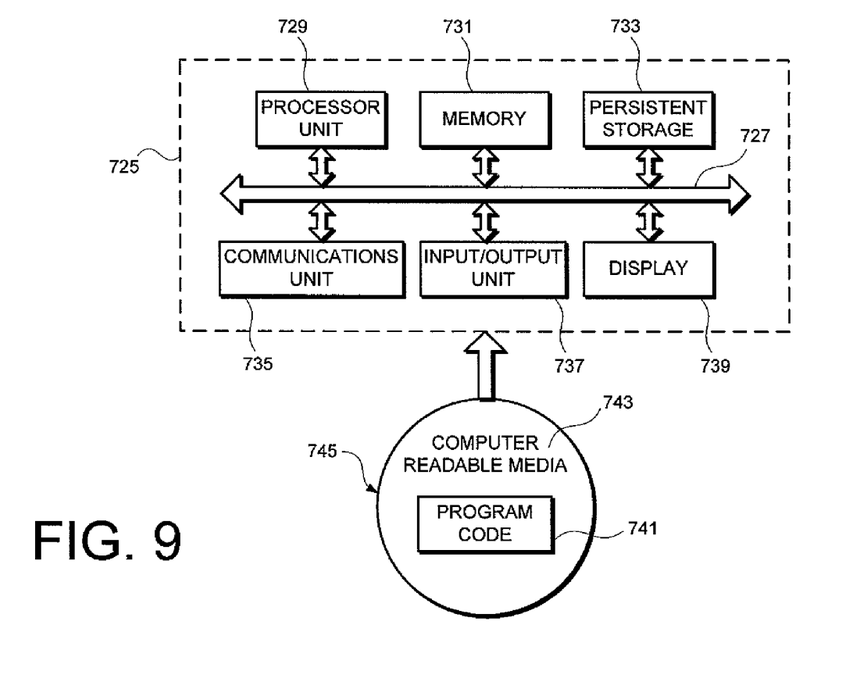
FIG. 9 is a schematic, block diagram of a data processing system in which the illustrative embodiments may be implemented.

With reference now to FIG. 9, a block diagram of a data processing system 725 is shown in which illustrative embodiments may be implemented. In one embodiment, the data processing system 725 is an example of a printer server, such as the printer server 104 in FIG. 1, in which a print manager, such as the print manager 248 in FIG. 3, may be implemented. In another embodiment, the data processing system 725 is a printer, such as the destination printer 212 in FIG. 3. In another embodiment, the data processing system 725 is an example of a mobile communication device, such as a cellular phone, in which a tracking application, such as the tracking application 254 in FIG. 3, may be implemented. Computer-usable program code or instructions implementing the processes used in the illustrative embodiments may be located on the data processing system 725. The data processing system 725 includes a communications fabric 727, which provides communications between a processor unit 729, a memory 731, a persistent storage 733, a communications unit 735, an input/output (I/O) unit 737, and a display 739.

The processor unit 729 serves to execute instructions for software that may be loaded into the memory 731. The processor unit 729 may be a set of one or more processors or may be a multi-processor core, depending on the particular implementation. Further, the processor unit 729 may be implemented using one or more heterogeneous processor systems in which a main processor is present with secondary processors on a single chip. As another illustrative example, the processor unit 729 may be a symmetric multi-processor system containing multiple processors of the same type.

The memory 731, in these examples, may be, for example, a random access memory or any other suitable volatile or non-volatile storage device. The persistent storage 733 may take various forms depending on the particular implementation. For example, the persistent storage 733 may contain one or more components or devices. For example, the persistent storage 733 may be a hard drive, a flash memory, a rewritable optical disk, a rewritable magnetic tape, or some combination of the above. The media used by the persistent storage 733 also may be removable. For example, a removable hard drive may be used for the persistent storage 733.

The communications unit 735, in these examples, provides for communications with other data processing systems or communication devices. In these examples, the communications unit 735 may be a network interface card. The communications unit 735 may provide communications through the use of either or both physical and wireless communication links.

The input/output unit 737 allows for the input and output of data with other devices that may be connected to the data processing system 725. For example, the input/output unit 737 may provide a connection for user input through a keyboard and mouse. Further, the input/output unit 737 may send output, such as a print job, to a printer. In the case in which the data processing system 725 is a cellular phone, the input/output unit 737 may also allow devices to be connected to the cellular phone, such as microphones, headsets, and controllers. The display 739 provides a mechanism to display information to a user. In the case in which the data processing system 725 is a cellular phone, the display 739 may be a graphical user interface on the cellular phone.

Instructions for the operating system and applications or programs are located on the persistent storage 733. These instructions may be loaded into the memory 731 for execution by the processor unit 729. The processes of the different embodiments may be performed by the processor unit 729 using computer-implemented instructions, which may be located in a memory, such as the memory 731. These instructions are referred to as program code, computer-usable program code, or computer-readable program code that may be read and executed by a processor in the processor unit 729. The program code in the different embodiments may be embodied on different physical or tangible computer-readable media, such as the memory 731 or the persistent storage 733.

Program code 741 is located in a functional form on a computer-readable media 743 and may be loaded onto or transferred to the data processing system 725 for execution by the processor unit 729. The program code 741 and the computer-readable media 743 form computer program product 745 in these examples. In one embodiment, the computer program product 745 is a print manager, such as the print manager 248 in FIG. 3. In this embodiment, the data processing system 725 may be any server, and the program code 741 may include computer-usable program code capable of receiving a print job sent from the mobile communication device, determining a location of the mobile communication device, identifying a printer proximate the mobile communication device, and initiating execution of the print job at the identified printer.

In another embodiment, the data processing system 725 is a printer, and the program code 741 loaded thereon may include computer-usable program code capable of receiving a print job initiated by a mobile communication device associated with a user, detecting a presence of the mobile communication device, and printing a document associated with the print job when the presence of the mobile communication device is detected.

In one example, the computer-readable media 743 may be in a tangible form, such as, for example, an optical or magnetic disc that is inserted or placed into a drive or other device that is part of the persistent storage 733 for transfer onto a storage device, such as a hard drive that is part of the persistent storage 733. In a tangible form, the computer-readable media 743 also may take the form of a persistent storage, such as a hard drive or a flash memory that is connected to the data processing system 725. The tangible form of the computer-readable media 743 is also referred to as computer recordable storage media.

Alternatively, the program code 741 may be transferred to the data processing system 725 from the computer-readable media 743 through a communication link to the communications unit 735 or through a connection to the input/output unit 737. The communication link or the connection may be physical or wireless in the illustrative examples. The computer-readable media 743 also may take the form of non-tangible media, such as communication links or wireless transmissions containing the program code 741. In the example in which the data processing system 725 is a mobile communication device, the program code 741 may be a tracking application and be deployed to the mobile communication device via CDMA (e.g., cdmaOne or CDMA2000), GSM, 3G, Edge, an Over-the-air network, Bluetooth, or any other wireless transmission medium.

The different components illustrated for the data processing system 725 are not meant to provide architectural limitations to the manner in which different embodiments may be implemented. The different illustrative embodiments may be implemented in a data processing system including components in addition to or in place of those illustrated for data processing system 725. Other components shown in FIG. 9 can be varied from the illustrative examples shown.

As one example, a storage device in the data processing system 725 is any hardware apparatus that may store data. The memory 731, the persistent storage 733, and the computer-readable media 743 are examples of storage devices in a tangible form.

In another example, a bus system may be used to implement the communications fabric 727 and may be comprised of one or more buses, such as a system bus or an input/output bus. Of course, the bus system may be implemented using any suitable type of architecture that provides for a transfer of data between different components or devices attached to the bus system. Additionally, the communications unit 735 may include one or more devices used to transmit and receive data, such as a modem or a network adapter. Further, a memory may be, for example, the memory 731 or a cache such as found in an interface and memory controller hub that may be present in the communications fabric 727.

The principles of the present invention can take the form of an entirely hardware embodiment, an entirely software embodiment, or an embodiment containing both hardware and software elements. In one embodiment, the invention is implemented in software, which includes but is not limited to, firmware, resident software, microcode, and other computer readable code.

Furthermore, the principles of the present invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The previous detailed description is of a small number of embodiments for implementing the invention and is not intended to be limiting in scope. One of skill in this art will immediately envisage the methods and variations used to implement this invention in other areas than those described in detail. For example, instead of being used in a network printer environment, the illustrative embodiments may be used to execute any process on at least one of a set of processors based on a location of the mobile communication device sending the processing job. The following claims set forth a number of the embodiments of the invention disclosed with greater particularity.

What is claimed:

1. A method, comprising:
   receiving a print job sent from a mobile communication device associated with a user;
   identifying a printer proximate the mobile communication device;
   determining whether the mobile communication device is within a print activation distance of the identified printer, wherein the print activation distance is a predetermined distance between the identified printer and the mobile communication device, the predetermined distance based on a maximum distance between the identified printer and the mobile communication device;
   when the mobile communication device is not within the print activation distance, waiting to execute the print job based on an expected pickup time;
   when the expected pickup time arrives:
      locating the mobile communication device;
      identifying the printer proximate the mobile communication device; and
      initiating execution of the print job on the identified printer when the mobile communication device is within the print activation distance of the identified printer; and
   when the mobile communication device is within the print activation distance, initiating execution of the print job at the identified printer, wherein the printer proximate the mobile communication device is a closest distance printer to the mobile communication device.

2. The method of claim 1, wherein the identifying of the printer proximate the mobile communication device comprises identifying a set of printers capable of performing the print job based on a set of print job parameters associated with the print job.

3. The method of claim 2, further comprising determining a respective distance between the mobile communication device and each of the set of printers.

4. The method of claim 1, wherein the initiating execution of the print job at the identified printer is in response to authenticating the user.

5. The method of claim 1, wherein the user is authenticated via a phone connection between the mobile communication device and a phone number associated with the identified printer.

6. The method of claim 2, wherein the set of print job parameters comprises a file location of a document.

7. The method of claim 1, further comprising deploying a tracking application to the mobile communication device to facilitate determining a location of the mobile communication device.

8. The method of claim 1, further comprising initiating an authorization prompt on the mobile communication device requesting the user to authorize printing a document at the identified printer.

9. The method of claim 1, further comprising:
  receiving confirmation that a document is printed at the identified printer; and
  responsive to receiving the confirmation, initiating a notification on the mobile communication device that the document is printed.

10. The method of claim 2, further comprising determining whether the identified printer is capable of performing the print job based on the set of print job parameters.

11. The method of claim 2, wherein the set of print job parameters further comprises a user-defined time to begin printing a document, and wherein the determining step, the identifying steps, and the initiating step are initiated at the user-defined time.

12. The method of claim 1, wherein the mobile communication device is associated with a default printer, and the identifying of the printer proximate the mobile communication device is in response to determining that the default printer is unavailable.

13. The method of claim 2, wherein the set of print job parameters comprises a maximum distance that the user is willing to travel to retrieve a document associated with the print job.

14. A non-transitory computer readable medium comprising instructions that, when executed by a processor, perform:
  receiving a print job sent from a mobile communication device associated with a user;
  identifying a printer proximate the mobile communication device;
  determining whether the mobile communication device is within a print activation distance of the identified printer, wherein the print activation distance is a predetermined distance between the identified printer and the mobile communication device, the predetermined distance based on a maximum distance between the identified printer and the mobile communication device;
  when the mobile communication device is not within the print activation distance, waiting to execute the print job based on an expected pickup time;
  when the expected pickup time arrives:
    locating the mobile communication device;
    identifying the printer proximate the mobile communication device; and
    initiating execution of the print job on the identified printer when the mobile communication device is within the print activation distance of the identified printer; and
  when the mobile communication device is within the print activation distance, initiating execution of the print job at the identified printer, wherein the printer proximate the mobile communication device is a closest distance printer to the mobile communication device.

15. The non-transitory computer readable medium of claim 14, wherein the identifying of the printer proximate the mobile communication device comprises identifying a set of printers capable of performing the print job based on a set of print job parameters associated with the print job.

16. The non-transitory computer readable medium of claim 15, further comprising instructions that perform determining a respective distance between the mobile communication device and each of the set of printers.

17. The non-transitory computer readable medium of claim 14, wherein the initiating execution of the print job at the identified printer is in response to authenticating the user.

18. The non-transitory computer readable medium of claim 14, wherein the user is authenticated via a phone connection between the mobile communication device and a phone number associated with the identified printer.

19. The non-transitory computer readable medium of claim 15, wherein the set of print job parameters comprises a file location of a document.

20. The non-transitory computer readable medium of claim 14, further comprising instructions that perform deploying a tracking application to the mobile communication device to facilitate determining a location of the mobile communication device.

* * * * *